(12) United States Patent
Wang et al.

(10) Patent No.: US 7,134,790 B2
(45) Date of Patent: Nov. 14, 2006

(54) RECIRCULATING APPARATUS OF LINEAR MOTION GUIDING

(75) Inventors: Chin-Pei Wang, Taichung (TW); Chiung-Hui Tsai, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 67 days.

(21) Appl. No.: 11/074,555

(22) Filed: Mar. 7, 2005

(65) Prior Publication Data

US 2006/0198563 A1    Sep. 7, 2006

(51) Int. Cl.
*F16C 29/06* (2006.01)
(52) U.S. Cl. .............................. 384/45; 384/44; 384/13
(58) Field of Classification Search .................. 384/13, 384/43–45
See application file for complete search history.

(56) References Cited

U.S. PATENT DOCUMENTS 4,662,763 A * 5/1987 Itoh ............................ 384/45
5,193,914 A * 3/1993 Tanaka ......................... 384/45
2002/0114544 A1* 8/2002 Matsui et al. .................. 384/45

FOREIGN PATENT DOCUMENTS

JP         07208466 A  *  8/1995
JP       2002054633 A  *  2/2002

* cited by examiner

*Primary Examiner*—Thomas R. Hannon
(74) *Attorney, Agent, or Firm*—Charles E. Baxley

(57) ABSTRACT

The present invention relates to a circulating apparatus for a linear guideway, and more particularly to the component of the unloading circulating portion of a rolling module of linear motion, the circulating apparatus is J-shaped, an end of which is disposed in the through holes, and end of which is connected to the loading path of the sliding block, the circulating apparatus is provided with a circulating path for enabling the rolling elements to move endlessly and circularly, in the circulating path are arranged two opposite grooves, the circulating apparatus comprises an outer circulating half tube and an inner circulating half tube which are connected together along the two opposite grooves.

9 Claims, 7 Drawing Sheets

RECIRCULATING APPARATUS OF LINEAR MOTION GUIDING

BACKGROUND OF THE INVENTION

1. Field of the Invention

The present invention relates to a circulating apparatus for a linear guideway which usually provides linear-motion transmission for precision control equipments and is widely used on mechanical arms, industrial mechanism, automatic equipments, measuring devices and electronic instruments.

2. Description of the Prior Arts

The working principle of a linear guideway is that a plurality of rolling elements are employed to move between the sliding block and the rail so as to cause relative motion between the sliding block and the rail, and a circulating apparatus is used to make the rolling elements move endlessly.

For example, JP Patent No. 2002-54633 discloses a rolling-element circulating system which is made up of a plurality of independent components, wherein the rolling-element retainers 11, 12, 13, the circulating path 14 and the circulating unit (including 15a and 15b) are independent components. The respective independent components are not integral with the slide block 4, the disadvantage of this circulating system is that it is made up too many independent components, and thus the assembly is complicated and time-consuming. Besides, two many connections between the respective components will adversely affect the stable motion of the rolling elements, and as a result, noise will be caused.

Another rolling element circulating system as disclosed by U.S. Pat. No. 4,662,763 generally consists of two-part split tube of opposed J shape, this design allows the unloading area of the circulating portion of the rolling elements to be a unitary structure, thus eliminating the connection problem. However, the sliding block must be particularly designed to cooperate with the J-shaped tube and the J-shaped tube should be additionally provided with positioning boards, thus complicating the assembly work. Furthermore, there is no space in the J-shaped tube for allowing the flow of the lubrication, the rolling elements cannot be lubricated easily. Besides, due to the J-shaped tube is split into two half parts along the horizontal direction thereof, when the rolling elements move into the J-shaped tube from the loading path, the J-shaped tube is likely to be split apart since the striking force of the rolling element acting on the J-shaped tube is in the direction nearly orthogonal to the dividing line (along which the two parts of the tube are connected) of the tube.

Another rolling element circulating system as disclosed by JP Patent No. 3349238 generally consists of four U-shaped tubes having ball-retaining recess, and the connecting line of (along which the two parts of the tube are connected) the tube is located towards the ball-retaining recess, the defect of this design is that the striking force of the rolling element is applied in the direction orthogonal to the dividing line (along which the two parts of the tube are connected) of the tube, so that the circulating system is also likely to be split apart, and the rolling motion of the rolling elements will be affected adversely.

The present invention has arisen to mitigate and/or obviate the afore-described disadvantages.

SUMMARY OF THE INVENTION

The present invention relates to a recirculating apparatus of a linear motion guiding, which comprises an elongated rail and a sliding block moveably mounted on the rail, on the sliding block is provided with loading path, through holes and a circulating apparatus, the loading path on the sliding block is formed correspondingly to the rolling passages of the rail, the circulating apparatus is an unloading circulating member which cooperates with the loading path of the sliding block so as to form a complete circulating system for rolling elements, so that the sliding block can slide along the elongated rail.

The circulating apparatus is J-shaped, an end of which is disposed in the through holes, and end of which is connected to the loading path of the sliding block, in the circulating apparatus is provided with a circulating path for enabling the circulating motion of rolling elements, and the circulating apparatus is made up of two half parts for easy manufacturing.

In the circulating path are arranged two opposite grooves for allowing the passage of the linking parts of the rolling elements or facilitating the passage of lubrication, so that the rolling elements can be lubricated without failure.

The circulating apparatus comprises an outer circulating half tube and an inner circulating half tube which are connected together along the two opposite grooves, so that the rolling elements can move in the circulating path more stably without being adversely affected the connecting line of the circulating apparatus.

Furthermore, for facilitating the assembly, an end of the through holes is arranged a positioning tongue and a positioning groove, so that the circulating apparatus will be positioned more stably in the through holes of the sliding block, or an end of the inner circulating half tube connecting to the loading path is provided with a positioning projection which enables the circulating apparatus to be engaged with the sliding block more stably.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
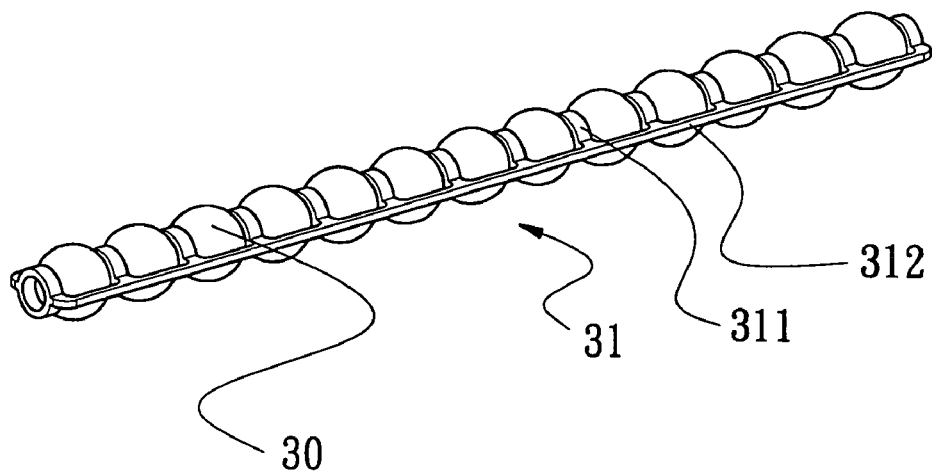
FIG. 1A shows a linear motion rolling module.
Figure 1B:
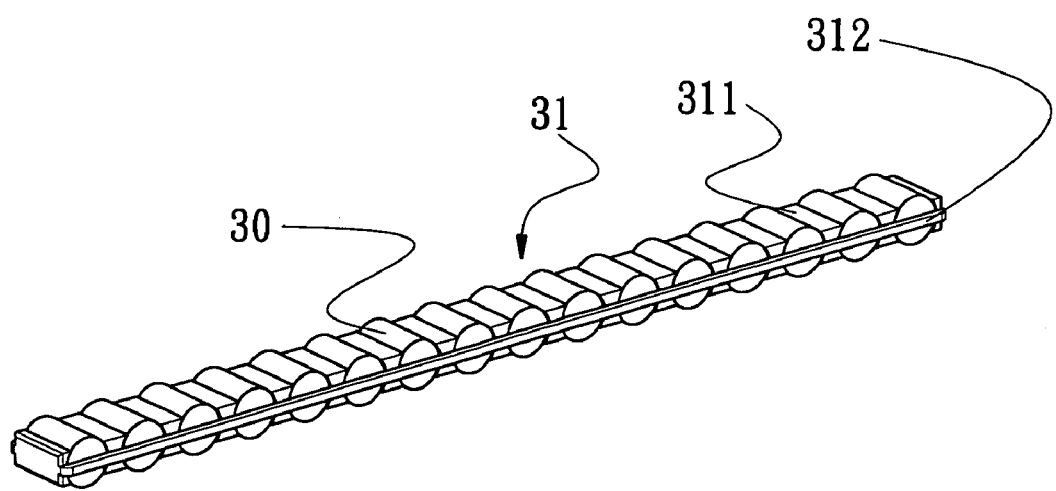
FIG. 1B shows another linear motion rolling module.

FIG. 1 shows a rolling module 31 comprises a plurality of rolling elements 30, between each two neighboring rolling elements 30 is disposed a spacer 311 and a connecting portion 312 used to connect the respective rolling elements 30 together, wherein the rolling elements 30 in FIG. 1A are spherical-shaped, while the rolling element 30 in FIG. 1B are cylindrical shaped.

Figure 2:
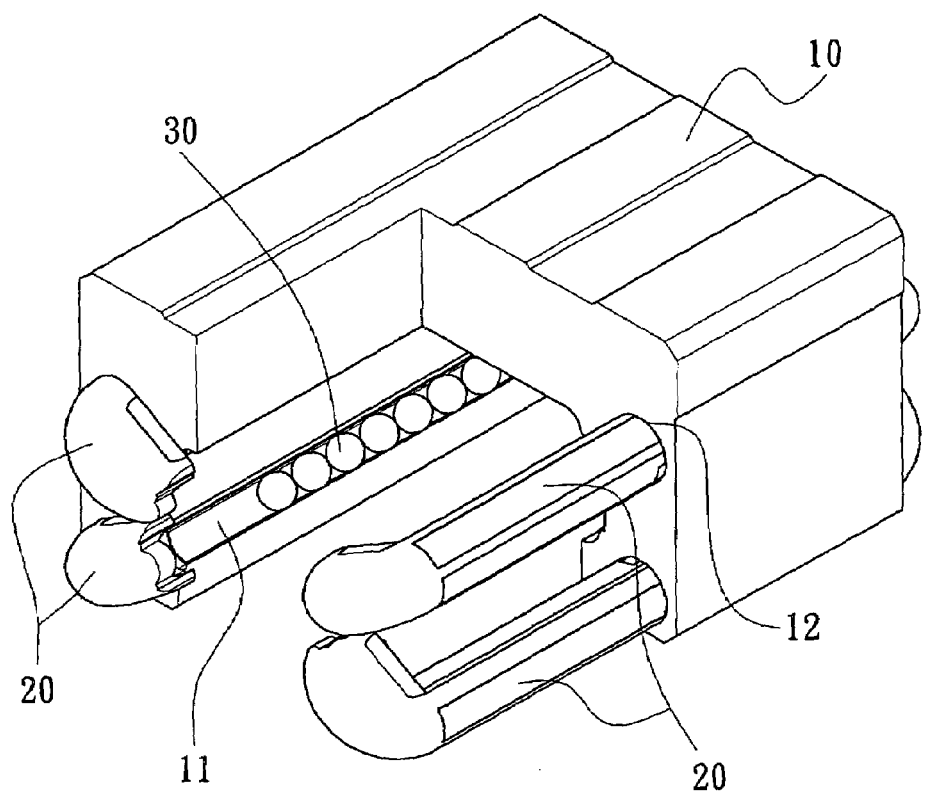
FIG. 2 is a perspective view of showing a sliding block in accordance with the present invention.

FIG. 2 is a perspective view of showing a sliding block in accordance with the present invention, in which, the sliding block 10 is defined with loading path 11 in which the rolling elements 30 are rotatably received, so that the rolling motion of the rolling elements 30 can make the sliding block 10 move along the rail (not shown). At both end surface of the sliding block 10 are provided through holes 12, a circulating apparatus 20 is disposed in the unloading area of the sliding block 10, that is to say that the circulating apparatus 20 is inserted in the through holes 12 and connected to the loading paths 11, so as to allow the rolling elements 30 to move endlessly.

Figure 3:
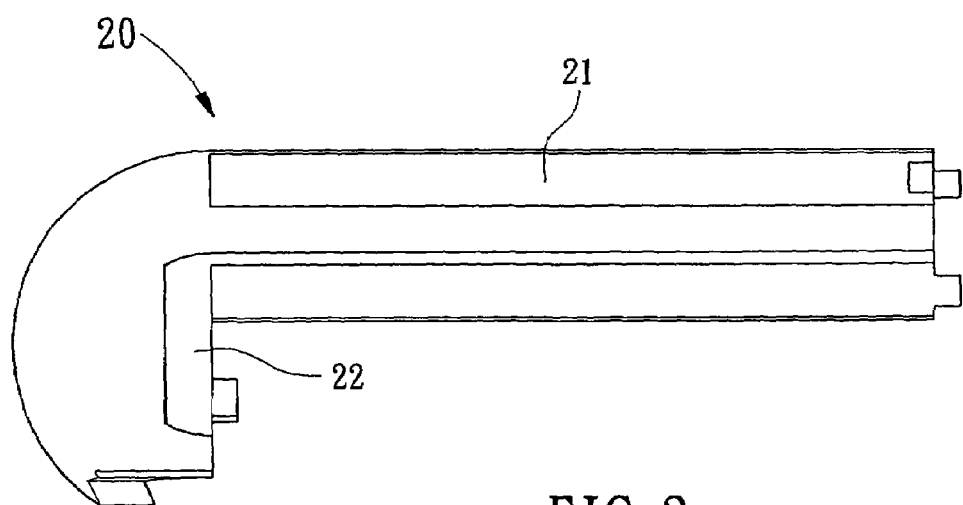
FIG. 3 shows the circulating apparatus of FIG. 2.
Figure 4A:
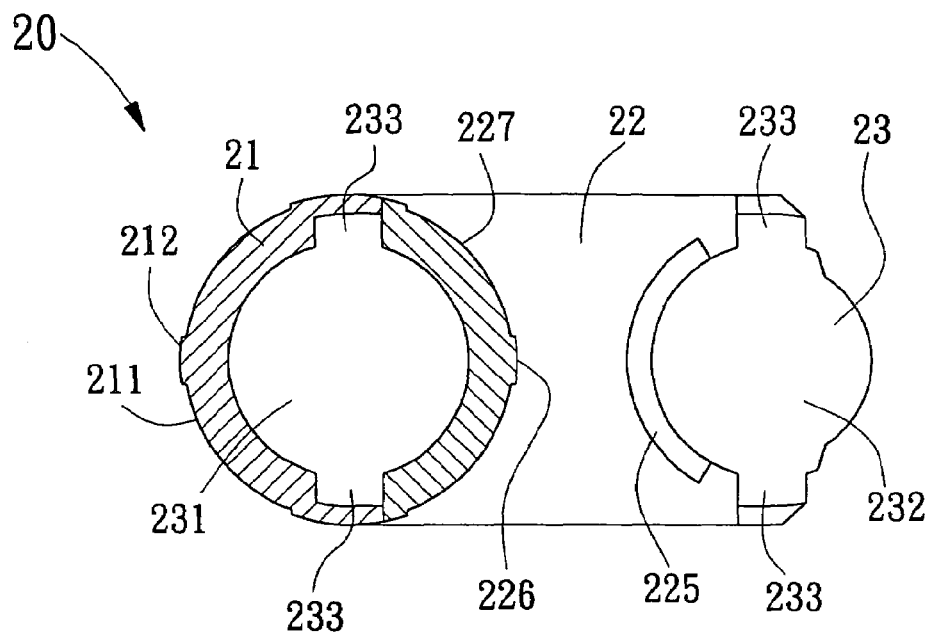
FIG. 4A shows the right side of the circulating apparatus of FIG. 3.
Figure 4B:
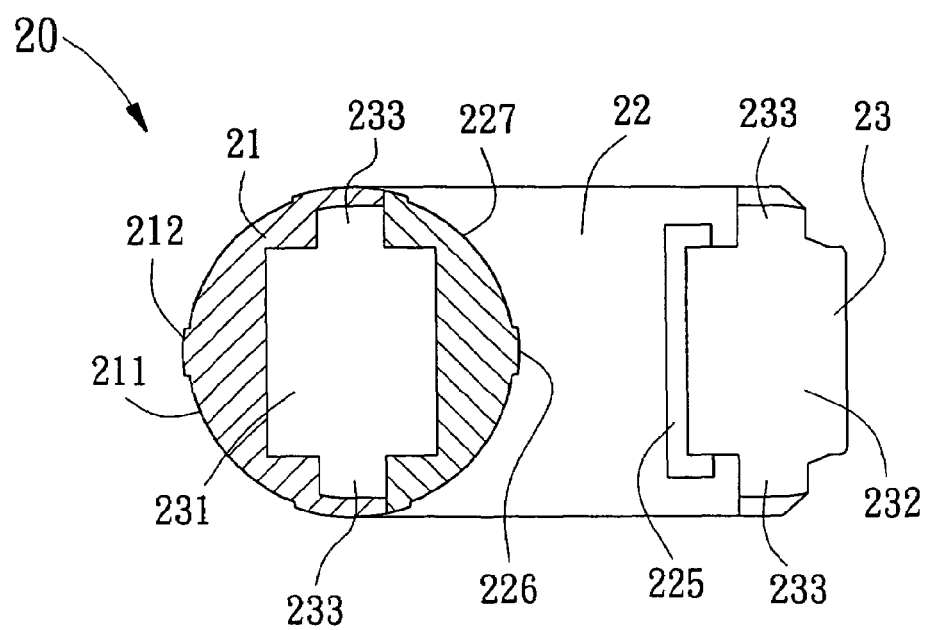
FIG. 4B shows the right side of the circulating apparatus of FIG. 3.

FIG. 3 shows the circulating apparatus of FIG. 2; FIGS. 4A–4B show the right side of the circulating apparatus of FIG. 3. The circulating apparatus 20 comprises an outer circulating half tube 21 and an inner circulating half tube 22 which define a circulating path 23 which is formed correspondingly to the profile of the rolling elements 30. FIG. 4A shows a circulating apparatus formed correspondingly to spherical rolling elements, wherein the circulating path 23 is circular-shaped in cross section, while the circulating apparatus in FIG. 4B is formed correspondingly to cylindrical rolling elements, wherein the circulating path 23 is rectangular-shaped in cross section. The circulating path 23 includes a straight circulating portion 231 and a curved return portion 232, through which the rolling elements 30 can move to the loading path 11. In the circulating path 23 are defined two opposite grooves 233, and the outer circulating half tube 21 and the inner circulating half tube 22 are connected along the grooves 233. The outer circulating half tube 21 are provided on its outer surface with a rib 212 and concave portion 211, while the inner circulating half tube 22 are also provided on its outer surface with a rib 226 and concave portion 227, so as to facilitate insertion of the circulating apparatus 20 into the through hole 12 of the sliding block 10. Besides, an end of the inner circulating half tube 22 connecting to the loading path 11 is provided with a positioning projection 225 which enables the circulating apparatus 20 to be engaged with the sliding block 10 more stably.

Figure 5:
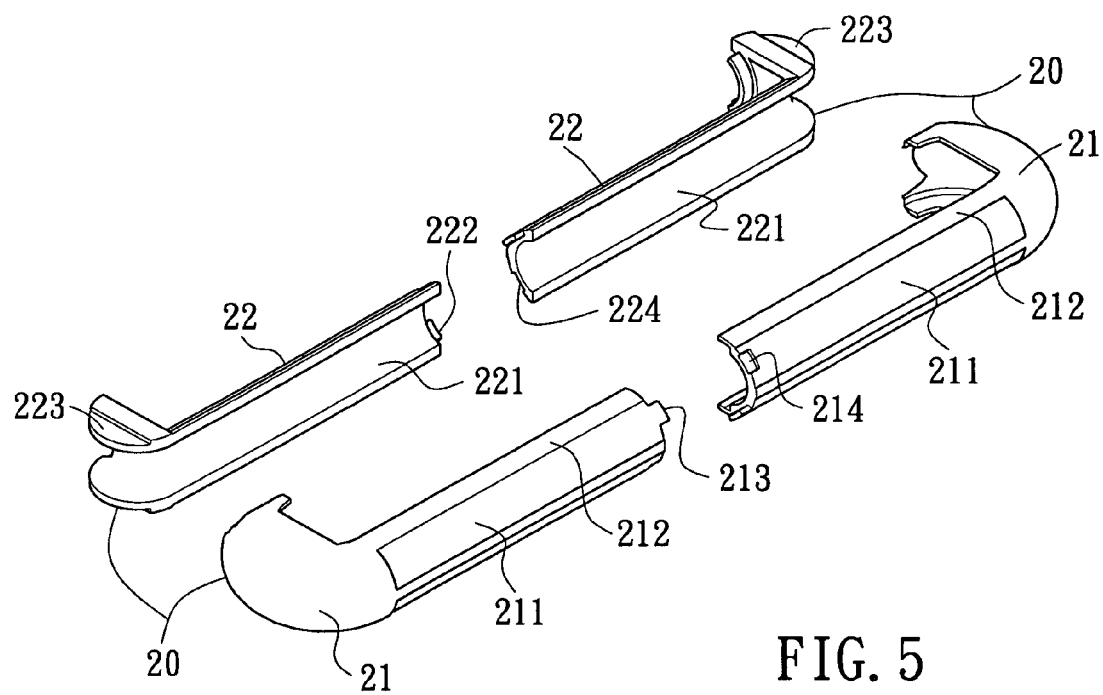
FIG. 5 is an exploded view of showing the circulating apparatus of FIG. 2.
Figure 6:
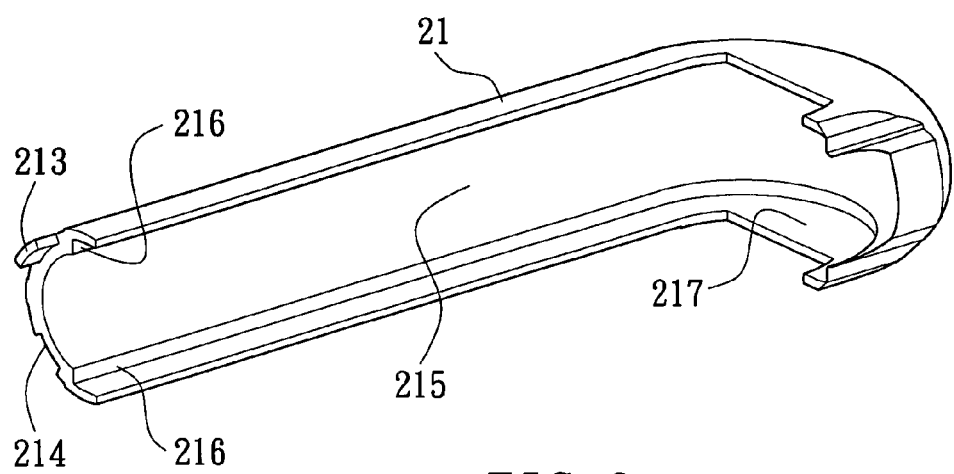
FIG. 6 shows the detailed feature of the inner circulating half tube of FIG. 5.
Figure 7:
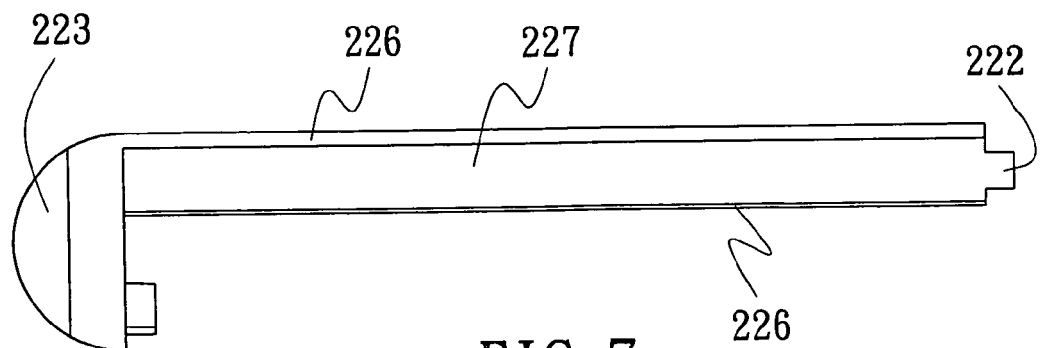
FIG. 7 shows the detailed feature of the outer circulating half tube 21 of FIG. 5.

FIG. 5 is an exploded view of showing the circulating apparatus of FIG. 2; FIG. 6 shows the detailed feature of the inner circulating half tube 22 of FIG. 5, and FIG. 7 shows the detailed feature of the outer circulating half tube 21 of FIG. 5, in which, the outer circulating half tube 21 and the inner circulating half tube 22 are provided with abutment surfaces 217 and 223 which are to be locked with each other for easy assembling the outer circulating half tube 21 with the inner circulating half tube 22. The outer circulating half tube 21 and the inner circulating half tube 22 are also provided with concave rolling portions 215, 221 which cooperate with each other to define the circulating passage 23. At either side of the concave rolling portions 215 is defined a step portion 216 which cooperate with the concave rolling portion 221 of the inner circulating half tube 22 to form the groove 233 as shown in FIG. 4. An end of the outer circulating half tube 21 with the rib 212 is provided with a positioning tongue 213 and a positioning groove 214, while the inner circulating half tube 22 is also correspondingly provided with a positioning tongue 222 and a positioning groove 224, so that the circulating apparatus 20 can be positioned more stably in the through holes 12.

Figure 8:
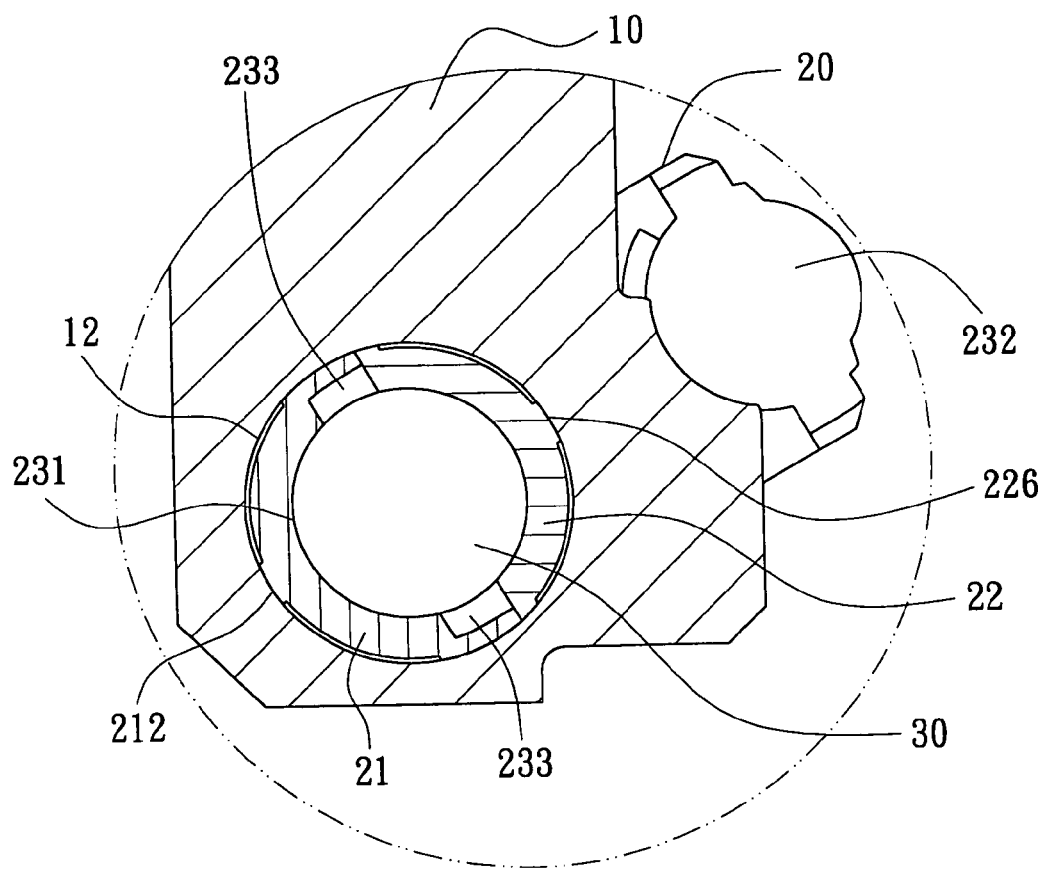
FIG. 8 shows the circulating apparatus being assembled in the sliding block.

FIG. 8 shows the circulating apparatus being assembled in the sliding block, in which, the through hole 12 contacts the ribs 212, 226 of the outer circulating half tube 21 and the inner circulating half tube 22 only, the contacting area is small and it allows for proper elastic adjustment, so that the circulating apparatus 20 can be assembled in the through hole 12 of the sliding block 10 more easily. Furthermore, the opposite grooves 233 in the circulating path permits passage of lubrication so that the rolling elements 30 can be lubricated enough when rolling through the circulating portion 231 and the return portion 232.

Figure 9:
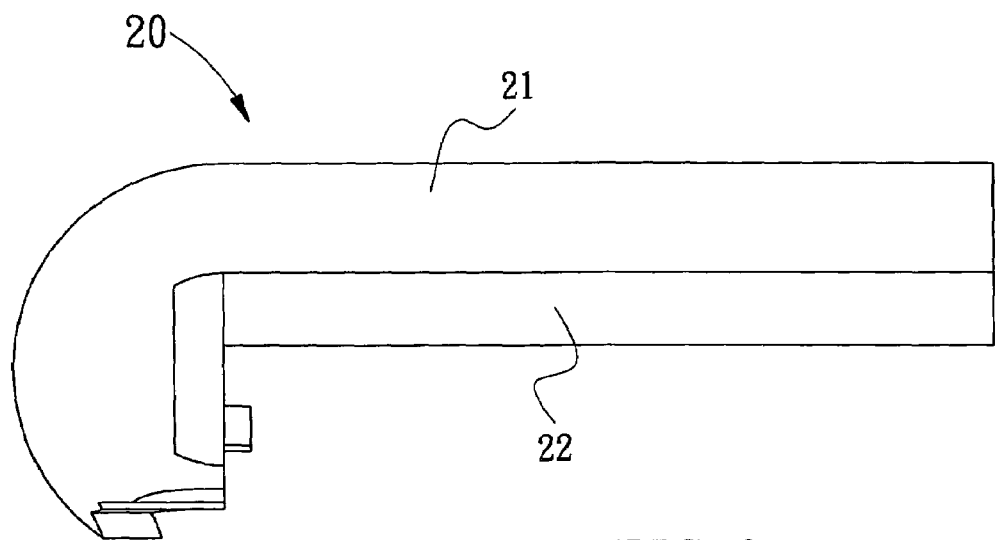
FIG. 9 shows a circulating apparatus for a linear guideway in accordance with another embodiment of the present invention.
Figure 10:
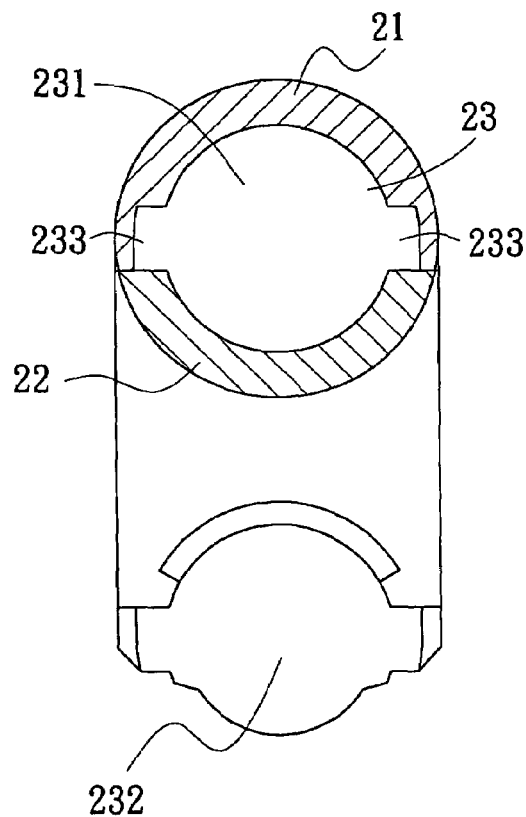
FIG. 10 is a right side view of the circulating apparatus in FIG. 9.

FIG. 9 shows a recirculating apparatus of a linear motion guiding in accordance with another embodiment of the present invention; FIG. 10 is a right side view of the circulating apparatus in FIG. 9. The recirculating apparatus of a linear motion guiding in this embodiment is similar with that of the first embodiment, except that the outer surface of the outer circulating half tube 21 and the inner circulating half tube 22 is smooth, so that it can be produced easily.

Figure 11A:
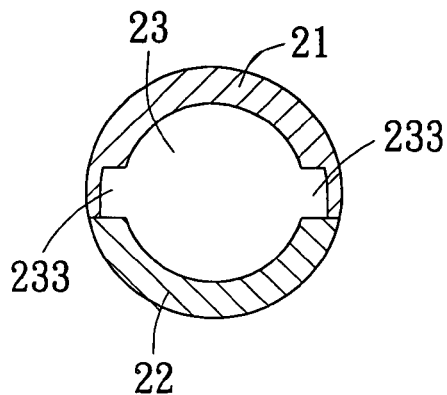
FIGS. 11A–11C shows grooves of the circulating path formed in different ways.
Figure 11B:
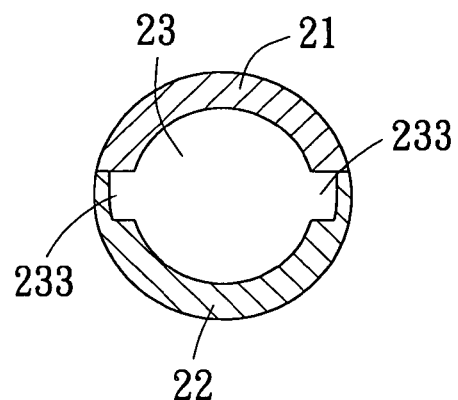
Figure 11C:
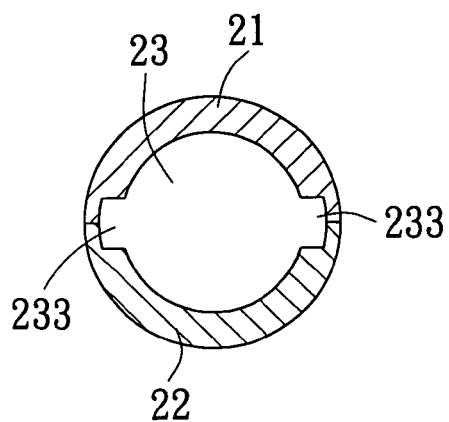

FIGS. 11A–11C show grooves of the circulating path formed in different ways, in which, the circulating path 23 is formed by the outer circulating half tube 21 and the inner circulating half tube 22. For example, the grooves 233 in FIG. 11A is formed on the outer circulating half tube 21, so that the outer surface of the outer circulating half tube 21 is greater than a semicircle. The grooves 233 in FIG. 11B is formed on the inner circulating half tube 22, so that the outer surface of the inner circulating half tube 22 is greater than a semicircle. And the grooves 233 in FIG. 11C is half formed on the outer circulating half tube 21 and half on the inner circulating half tube 22, so that the groove 233 is formed by the outer circulating half tube 21 and the inner circulating half tube 22.

While we have shown and described various embodiments in accordance with the present invention, it should be clear to those skilled in the art that further embodiments may be made without departing from the scope of the present invention.

What is claimed is:

1. A recirculating apparatus of a linear motion guiding, wherein the linear motion guiding comprising:
   an elongated rail formed with a plurality of rolling passages;
   a sliding block moveably mounted on the rail, on the sliding block provided with loading path, through holes and a circulating apparatus, the loading path on the sliding block formed correspondingly to the rolling passages of the rail, wherein the circulating apparatus is an unloading circulating member which cooperates with the loading path of the sliding block so as to form a complete circulating system for rolling elements, so that the sliding block can slide along the elongated rail; and
   the circulating apparatus is J-shaped, an end of which is disposed in the through holes, and end of which is connected to the loading path of the sliding block, the circulating apparatus is provided with a circulating path for enabling the rolling elements to move endlessly and circularly, in the circulating path are arranged two opposite grooves, the circulating apparatus comprises an outer circulating half tube and an inner circulating half tube which are connected together along the two opposite grooves.

2. The recirculating apparatus of a linear motion guiding as claimed in claim 1, wherein the grooves are located on the outer circulating half tube, so that an outer surface of the outer circulating half tube is greater than a semicircle.

3. The recirculating apparatus of a linear motion guiding as claimed in claim 1, wherein the grooves are located on the inner circulating half tube, so that an outer surface of the inner circulating half tube is greater than a semicircle.

4. The recirculating apparatus of a linear motion guiding as claimed in claim 1, wherein the grooves are half located on the outer circulating half tube and half on the inner circulating half tube, so that the groove are formed by the outer circulating half tube and the inner circulating half tube.

5. The recirculating apparatus of a linear motion guiding as claimed in claim 1, wherein ribs are formed on the outer surface of the outer circulating half tube and the inner circulating half tube.

6. The recirculating apparatus of a linear motion guiding as claimed in claim 1, wherein an end of the inner circulating half tube connecting to the loading path is provided with a positioning projection which enables the circulating apparatus to be engaged with the sliding block more stably.

7. The recirculating apparatus of a linear motion guiding as claimed in claim 1, wherein an end of the through holes is arranged a positioning tongue and a positioning groove, so that the circulating apparatus will be positioned more stably in the through holes of the sliding block.

8. The recirculating apparatus of a linear motion guiding as claimed in claim 1, wherein the rolling elements are balls.

9. The recirculating apparatus of a linear motion guiding as claimed in claim 1, wherein the rolling elements are cylinders.

* * * * *